June 21, 1938.    O. DAUS    2,121,687
CROSS COUNTRY VEHICLE
Filed June 16, 1936

Inventor,
Otto Daus,
By Frank S. Appleman,
Attorney

Patented June 21, 1938

2,121,687

UNITED STATES PATENT OFFICE 2,121,687

CROSS COUNTRY VEHICLE

Otto Daus, Hamburg, Germany

Application June 16, 1936, Serial No. 85,484
In Germany September 20, 1935

1 Claim. (Cl. 180—54)

My invention relates to motor-driven vehicles, and more particularly vehicles designed for cross-country driving. Motor vehicles of this kind having front and rear driven axles have already been built, but in the old constructions the power unit is mounted in such a way, that its weight produces considerable stresses in the chassis and other parts, thereby also affecting the bearings, so that a free rocking of the same can not take place. While in the old constructions an independent motor is provided for driving each axle, the motors are neither encompassed in a single block, nor are the axles free to rock, relative to a power unit.

The object of this invention is to design a motor-driven vehicle suitably for cross-country driving, in which there is provided for each axle a complete power unit comprising at least the driving engine, gears, differential, a pair of wheel-axles and springs. These power units are mounted on a tubular element of the frame, preferably the front power unit being mounted to oscillate relative to the said frame. Since the tubular frame extends through the power unit, as many such units as desired can be mounted on the same frame. Also the main tubular element of the frame can be equipped with strong thrust rods and draw-hooks. Because the front power unit with its center of gravity directly bears on the frame while the spring suspension of the axles bears directly on the unit and not on the frame, the unit can freely oscillate either to the left or to the right, without any danger of a rupture being thereby produced.

Figure 1:
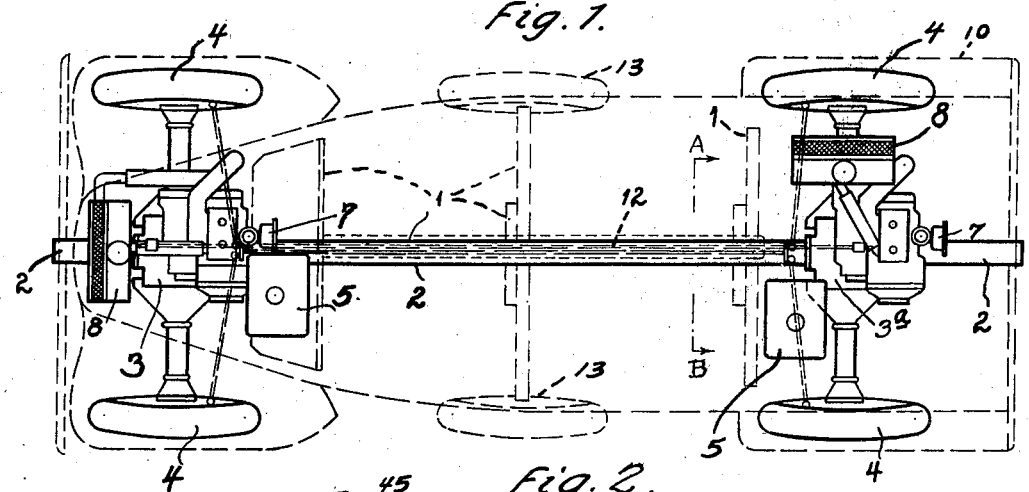
Figure 2:
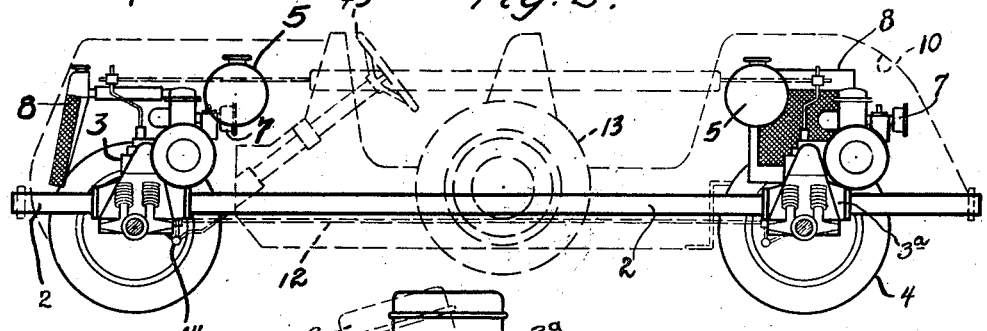
Figure 3:
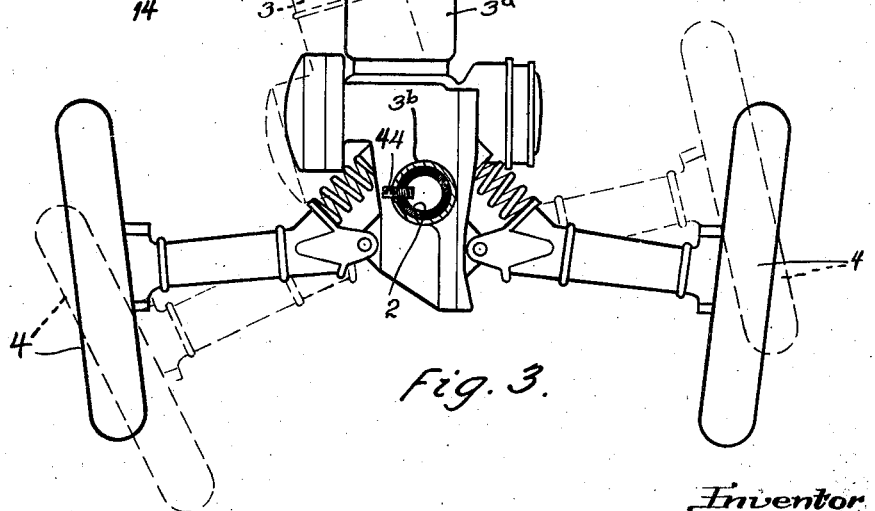

On the annexed more or less diagrammatic drawing, on which I have shown by way of illustration an embodiment of this invention, Fig. 1 is a top plan view of the chassis of the vehicle, while Fig. 2 is a side elevation thereof; and Fig. 3 is a vertical section taken at the rear of the vehicle and looking in a forward direction, parts being omitted for the sake of clarity.

As shown in the drawing, the vehicle has a frame 1, upon the longitudinal girder or "backbone" 2 of which two driving assemblies or power units 3, 3a are mounted in such a manner, that preferably the front power unit including the gears, the differential etc. and the pair of wheels 4 associated therewith can freely rock upon, or about the axis of the said backbone, which conveniently is of tubular construction, as shown. Preferably, one such backbone receives, carries and locates both power units with their associated pairs of wheels, this being the simplest arrangement and probably also the best from a mechanical standpoint.

As an alternative, a cranked backbone may be employed without any departure from the invention. Each power unit 3 and 3a respectively includes its own fuel tank 5 and carburator 7. The power unit 3a at the rear end of the chassis 1 is mounted in the same manner upon the tubular backbone 2 and is fixedly secured thereto, as by being screwed and/or clamped thereon. Fig. 3 shows the unit 3a secured to the tubular backbone 2 by a screw 44 which passes through a bearing portion 3b of the unit 3a. This figure shows also the unit 3 tilted in a counter-clockwise direction about the backbone 2. The two power units 3 and 3a are adapted to be clutched and declutched and put into and out of gear either separately or together. Any slight differences in power or phasal differences in the turning moments of the two engines are substantially compensated in practice by the reaction on the driving wheels of the ground traversed. The radiator 8 for the rear engine is preferably mounted laterally thereof and is associated with a suitable air intake in the cowling 10 indicated by broken lines and with the usual fan.

The front and rear pairs of wheels 4 can be steered conjointly by a steering shaft 12, running beneath the tubular backbone 2, steering control being afforded by the usual hand steering wheel 45 in front of the driver's seat. This coupled arrangement of the front and rear driving wheels 4 for steering purposes is such that when, for instance, the front wheels are locked over to the left, the rear wheels simultaneously lock over to the right, which enables very sharp corners being taken.

Extra wheels 13 are mounted laterally of the vehicle about the middle thereof and their mounting is such that these wheels can rotate and serve as supporting or carrying wheels when the vehicle is traveling over country of so rough a nature that the middle part of the chassis would otherwise at times dangerously approach the ground. Under these conditions, the wheels 13 which, as can be seen from Fig. 2, do not normally touch the ground, come into contact with any upstanding ridges, boulders or the like and thus help to support the weight of the vehicle so that the latter can continue to make progress through the drive transmitted by one or the other pair of driving wheels. It is to be emphasized that the extra wheels, being mounted as to be above the ordinary ground level, come into play as carriers only when the vehicle crosses ditches or surmounts banks, or the like.

What I claim is:

In a motor driven vehicle of the class described, including at least two pairs of driving wheels, separate axles for each pair of driving wheels, and a separate motor driving unit for each pair of the driving wheels, a tubular frame member extending completely through each of said driving units and comprising the sole support therefor, the axles of said driving wheels being operatively secured to the respective driving unit therefor, one of said driving units being rigidly secured to said tubular member, and the other of said driving units being pivotally secured to said tubular member.

OTTO DAUS.